United States Patent [19]

Turner

[11] 4,012,251

[45] Mar. 15, 1977

[54] MULTI-LAYERED PHOTOCONDUCTIVE MEMBER

[75] Inventor: Sam R. Turner, Webster, N.Y.

[73] Assignee: Xerox Corporation, Stamford, Conn.

[22] Filed: May 22, 1975

[21] Appl. No.: 580,119

[52] U.S. Cl. .................................. 96/1 PC; 96/1.8; 252/501; 260/860

[51] Int. Cl.² .................. G03G 5/06; G03G 5/04; G03G 5/08

[58] Field of Search .................... 96/1.5, 1.8, 1 PC; 252/501; 260/860

[56] References Cited

UNITED STATES PATENTS

| | | | |
|---|---|---|---|
| 3,159,483 | 12/1964 | Behmenburg et al. | 96/1.5 |
| 3,287,116 | 11/1966 | Hoegl | 96/1.5 |
| 3,418,116 | 12/1968 | Inami et al. | 96/1.5 |
| 3,536,781 | 10/1970 | Cotter | 96/1.5 |
| 3,837,851 | 9/1974 | Shattuck et al. | 96/1.5 |
| 3,839,034 | 10/1974 | Wiedemaun | 96/1.5 |
| 3,850,630 | 11/1974 | Regensburger et al. | 96/1.5 |
| 3,884,689 | 5/1975 | Limburg | 96/1.5 |
| 3,884,690 | 5/1975 | Radler | 96/1.5 |

*Primary Examiner*—Roland E. Martin, Jr.
*Attorney, Agent, or Firm*—James J. Ralabate; James Paul O'Sullivan; John H. Faro

[57] ABSTRACT

Multi-layered electrophotographic imaging member having a composite photoconductive insulating film wherein one layer of said film comprises a photoconductive material capable of substantial spectral response in the visible region of the electromagnetic spectrum, and a second layer of an electronically active insulating polymeric material, contiguous with said photoconductive layer, which is transparent, capable of facile transport of electrons which are injected into it upon photoexcitation of the contiguous photoconductive layer and yet incapable of substantial spectral response within the wavelength of primary photoresponse of the contiguous photoconductive layer.

18 Claims, No Drawings

MULTI-LAYERED PHOTOCONDUCTIVE MEMBER

BACKGROUND OF THE INVENTION

1. Field of the Invention imaging members.

2. Description of the Prior Art

This invention relates to electrophotography. More specifically, this invention discloses electrophotographic imaging members having composite photoconductive insulating layers and processes for utilizing said imaging members.

2. Description of the Prior Art

The formation and development of images on the imaging surfaces of photoconductive materials by electrostatic means is well known. The best known of the commercial processes, more commonly known as xerography, involves forming a latent electrostatic image on the imaging surface of an imaging member by first uniformly electrostatically charging the surface of the imaging layer in the dark and then exposing this electrostatically charged surface to a light and shadow image. The light-struck areas of the imaging layer are thus rendered relatively conductive and the electrostatic charge selectively dissipated in these irradiated areas. After the photoconductor is exposed, the latent electrostatic image on this image bearing surface is rendered visible by development with a finely divided colored marking material known in the art as "toner". This toner will be principally attracted to those areas on the image bearing surface having a polarity of charge opposite to the polarity of charge on the toner particles.

The developed image can then read or permanently affixed to the photoconductor when the imaging layer is not to be used. This latter practice is usually followed with respect to the binder-type photoconductive films (e.g., zinc oxide/ insulating resin binder) where the photoconductive imaging layer is also an integral part of the finished copy, U.S. Pat. Nos. 3,121,006 and 3,121,007.

In so called "plain paper" copying systems, the latent image can be developed on the imaging surface of a reusable photoconductor or transferred to another surface, such as a sheet of paper and thereafter developed. When the latent image is developed on the imaging surface of a reusable photoconductor, it is subsequently transferred to another substrate and then permanently affixed thereto. Any one of a variety of well-known techniques can be used to permanently affix the toner image to the copy sheet, including overcoating with transparent films, and solvent or thermal fusion of the toner particles to the supportive substrate.

In the above, plain paper copying systems, the materials used in the photoconductive layer should preferably be capable of rapid switching from insulating to conductive to insulating state in order to permit cyclic use of the imaging surface. The failure of a material to return to its relatively insulating state prior to the succeeding charging/imaging sequence will result in a reduction in the maximum charge acceptance of the photoreceptor. This phenonmenon commonly referred to in the art as "fatigue" has in the past been avoided by the selection of photoconductive materials possessing rapid switching capacity. Typical of materials suitable for use in such a rapidly cycling imaging system include anthracene, sulfur, selenium and mixtures thereof (U.S. Pat. No. 2,297,691); selenium being preferred being preferred because of its superior photosensitivity.

With the disclosure of the efficacy of poly(N-vinylcarbazole) as a photoconductor for electrophotography (U.S. Pat. No. 3,037,861) and the visible light sensitized compositions containing such polymers (U.S. Pat. No. 3,484,237), organic photoconductive materials have become the focus of increasing interest in the development of electrophotographic imaging systems. Organic photoconductive materials, however, do not possess the inherently photosensitivty to compete commercially with inorganic photoconductors such as amorphous selenium. Even where such organic phtoconductors are complexed with activators (as disclosed in the U.S. Pat. No. 3,848,237 the photogeneration of charge carriers is highly field dependent. In an attempt to take advantage of the best properties of both inorganic and organic photoconductors, certain composite photoconductive insulating layers have been disclosed wherein the light absorption function is performed by a relatively thin layer of photoconductive materials which is contiguous with a relatively thick layer of electronically active polymer, U.K. Pat. No. 1,337,228 and Canadian Pat. No. 932,199. In both the composite photoconductor systems disclosed in each of these patents, light is absorbed by the photoconductive layer which generates hole/electron pairs and thereafter injects one species of the photogenerated carriers into the electronically active layer where it is transported either to ground or to the surface bearing the sensitizing charge thereby selectively discharging the imaging member in the light-struck areas. Both of these patents disclose the use of hole and/or electron transport materials in this electronically active insulating layer. In Canadian Pat. No. 932,199 the electronically active insulating layer is disclosed as comprising a solid solution of a non-polymeric active molecule dispersed in a polymeric matrix. Patentee also indicates the equivalent results are obtainable wherein the electronically active insulating layer comprises a polymer having aromatic or heterocyclic electron acceptor moieties as an integral part thereof. No polymeric materials possessing such properties are specifically disclosed.

The mechanism by which such insulating electronically active layers function is believed to be dependent upon the relative steric relationship of the adjacent aromatic and/or heterocyclic groups within the polymer matrix and the relative distance between such groups. Modification of this steric relationship and/or increasing such distance will impair the ability of such electronically active films to effectively transport charge carriers. For example, uniaxial orientation of poly(N-vinylcarbazole) causes spatial constraint of the pendent carbazyl groups of the polymer. Films of poly(N-vinylcarbazole) which have undergone such orientation manifest significant deterioration in their ability to transport charge carriers and thus it is hypothesized that the constraints on the pendant carbazyl groups have impaired the ability of the film to transport charge carriers. It is expected that where similar spatial constraints are introduced chemically; that is, by restraining the freedom of movement of electronically active groups within a polymer, similar impairment of transport properties can be expected. Specific examples of such impairment would be the incorporation of the electronically active groups within the polymer backbone and thus inhibition of their freedom of movement relative to the electronically active groups in adjacent polymer chains.

Accordingly, it is the object of this invention to remove the above as well as related deficiencies in the prior art.

More specifically, it is the principle object of this invention to provide an electrophotographic imaging member having a composite photoconductive insulating film consisting essentially of two separate but contiguous layers.

It is another object of this invention to provide an electrophotographic imaging member having a composite photoconductive insulating film wherein one layer of said film is entirely polymeric and capable of rapid and efficient transport of electrons.

It is yet another object of this invention to provide an electrophotographic imaging process employing one of the above imaging members.

SUMMARY OF THE INVENTION

The above and related objects are achieved by providing a multi-layered electrophotograhic imaging member having a composite photoconductive insulating film wherein one layer of said film comprises a photoconductive material capable of substantial spectral response in the visible region of the electromagnetic spectrum and a second layer, contiguous with said photoconductive layer, comprising an electronically active insulating polymer. The polymer of this electronically active insulating layer is transparent and capable of facile transport of electrons which are injected into it upon photoexcitation of the contiguous photoconductive layer. Although the absorption spectrum of this polymer may overlap the absorption spectrum of the photoresponsive materials in the photoconductive layer, the extent of overlap is slight and insufficient to preclude or seriously restrict phtoactivation of the photoconductive layer even where image information is projected through the electronically active insulating polymeric layer. In a preferred embodiment of this invention, the photoconductive layer of the composite has a thickness in the range of from about 0.1 to about 5 microns and the electronically active insulating polymeric layer has a thickness in the range of from about 10 to about 100 microns; the ratio of thicknesses of the photoconductor layer to electronically active insulating layer being in the range of from about 1:2 to about 1:200.

DESCRIPTION OF THE INVENTION INCLUDING PREFERRED EMBODIMENTS

The photoconductive layer of the photoconductive insulating composite film an contain inorganic crystalline photoconductors such as cadmium sulfide, cadmium sulfoselenide, cadmium selenide, zinc sulfide, zinc oxide and mixtures thereof. Ordinarily, these crystallined materials are dispersed in a polymeric binder matrix. The polymers used in such dispersals can themselves be electronically active or electronically inert. Crystalline selenium (the hexagonal crystalline form), commonly referred to as trigonal selenium, is also suitable for use in such photoconductive binder layers. Organic photoconductive materials can also be used in the photoconductive binder layers of these composite films. Typical of the organic photocondcutors which are suitable for use in this invention include the metal-free and metal-containing phthalocyanine pigments, benzimidazole pigments, perylene pigments, quinacridone pigments, indigoid pigments, squaric acid, polynuclear quinones, cyanines (e.g. azocyanines, mercocyanines) and pyrylium (e.g., benzopyrylium, thiapyrylium, selenapyrylium) salts. Alternatively, the photoconductive layer of this composite film can comprise photoconductive glasses including amorphous selenium and selenium alloys (preferably tellurium and arsenic alloys of selenium). The photoconductive layer of this composite can be prepared by any technique traditionally used in the literature which is suitable for the formation of photoconductive films. In a typical electrophotographic imaging member of this invention, the arrangement of the layers in the photoconductive composite film vis-a-vis the supportive substrate is immaterial to the performance of this imaging member. In the preferred embodiments of this invention, the photoconductive layer of this composite film is formed directly on the supportive substrate. The surface of the substrate may be modified so as to provide a blocking contact or can be provided with a separate coating which is designed to prevent dark injection of carriers from the substrate into the photoconductive layer. The amount of photoconducitve materials deposited on this supportive substrate should be sufficient to provide this substrate with a layer having a thickness in the range of from about 0.02 to up to about 20 microns. Where thicker photoconductive layers are used (greater than 5 microns in thickness) it may also be desirable to include within such photoconductive layers additional materials to eliminate the effects of trapping of minority charge carriers generated within the bulk of such photoconductive layers. For example, where an active polymeric binder such as poly(N-vinylcarbazole) is used as the dispersal medium for trigonal selenium the addition of small quantities (less than 5 and preferably less than 1 weight percent) of 2,4,7-trinitro-9-fluorenone has been shown to reduce the trapping of electrons generated within the bulk of such photoconductive layers. The photoconductive layers prepared from the materials described above are characteristically photoresponsive throughout most, if not all, the visible range of the electromagnetic spectrum.

The electronically active insulating polymeric layer of the composite photoconductive film comprises a solid linear polymer having recurring structural units of the formula

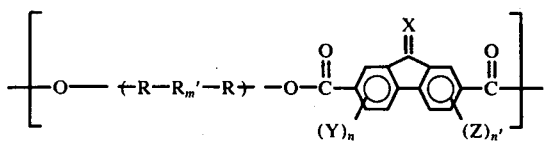

wherein
X is oxygen or dicyanomethylene;
Y and Z are independently selected from the group conisting of NO$_2$, halogen —CN and —CF$_3$;
R is a hydrocarlyene radical having from 1 to 10 carbon atoms;
R' is oxygen or sulfur;
m is 0 or 1; and
n and n'can range from 0 to 3.

The polymers as defined in the above formula are polyesters and can be prepared by techniques and with equipment traditionally employed in known condensation/polymerization reactions. Methods for preparation of such polymers are disclosed in U.S. Pat. No. 3,536,781 (more specifically, Examples XI–XIV)

which is hereby incorporated by reference in its entirety. Representative of polymers which are especially suitable for use in the electronically active insulating layer of the photoconductive composite film include the condensation products of the following diols with the following carboxylic acid halides:

| Polymer | Diols | Carboxylic Acid Halides |
|---|---|---|
| 1 | ethylene glycol | 4,5-dinitrofluoroenone-2,7-dicarboxylic acid chloride |
| 2 | 1,3-propane diol | 4,5-dinitrofluoroenone-2,7-dicarboxylic acid chloride |
| 3 | 1,6-hexane diol | 4,5-dinitrofluoroenone-2,6-dicarboxylic acid chloride |
| 4 | 1,6-hexane diol | 9-dicyanomethylene fluorene-2,7-dicarboxylic acid chloride |
| 5 | 1,6-hexane diol | fluorenone:2,7-dicarboxylic acid chloride |
| 6 | 1,6-hexane diol | 4,5-dinitro-9-dicyanomethylene fluorenone-2,7-dicarboxylic acid chloride |
| 7 | 1,2-eicosane diol | 4,5-dinitrofluorenone-2,7-dicarboxylic acid chloride |

The hydrocarbon constituent of the diols useful in preparation of these polymers must be incapable of substantial charge transfer interaction with the carbocyclic constituent of the carboxylic acid halides.

These polymers can be cast from an appropriate solvent, such as hexafluoroisopropanol, either onto the supportive substrate of the electrophotographic imaging member or onto the previously formed layer of photoconductive materials. Sufficient polymer solution must be transferred to the receptive surface in order to provide a dry film having a thickness in the range of from about 5 to about 100 microns. Of course, formation of electronically active insulating layers from these materials can involve the multiple coating of solutions of these materials in order to build up a layer to the desired thickness. The electronically active insulating polymer layers prepared from these material have a bulk resistivity in excess of $10^{10}$ ohms-cms and preferably, a bulk resistivity in excess of $10^{12}$ ohms-cms. The insulating layers prepared from these polymers are slightly yellow in color; and, therefore, unless the image input is filtered so as to exclude photoactivation of this insulating layer, some generation of carriers will occur within the bulk of this layer. Photoactivation of the transport layer is generally regarded as undesirable since it is disruptive of the cycling efficiency of the photoconductive composite and, therefore, is preferably avoided. Where photoactivation of this transport is unavoidable, its adverse effects on cycling efficiency can be overcome by doping with small quantities of Lewis bases (less than 5 and preferably less than 1 weight percent) in the conventional manner.

After having prepared an electrophotographic imaging member having a composite photoconductive insulating layer of the type described hereinabove, this member can be used in conventional electrophotographic imaging methods and apparatus. As indicated previously, the preferred configuration of this electrophotographic imaging member would dictate that the photoconductive layer be sandwiched between the conductive substrate and the electronically active insulating polymer layer. This configuration protects the photoconductive layer from exposure to chemical changes induced by the ambient environment and in addition precludes mechanical damage to this layer which can occur as an incident to development/ transfer/cleaning steps of the electrophotographic imaging process. Where the electronically active layer is capable of facile transport of electrons, the polarity of the sensitizing charge imparted to the surface thereof is positive. This structure, therefore, permits the more ready adaptation of this type of photoreceptor structure to sensitization and development techniques traditionally used in conjunction with selenium photoreceptors.

The Examples which follow further define, describe and illustrate the preparation and use of the electrophotographic imaging members of this invention. Apparatus and techniques used in the preparation and the evaluation of such imaging members are standard or as hereinbefore described. Parts and percentages appearing in such Examples are by weight unless otherwise indicated.

EXAMPLE I

A solution containing 11.82 grams of 1,6-hexane diol and 39.21 grams of 4,5-dinitrofluorenone-2,7-dicarboxylic acid chloride in 300 milliliters of 1,2-dichloroethane is heated to reflux under an argon atomosphere in a three-necked, round bottom flask equipped with a thermometer, reflux condenser, magnetic stirrer and an additional funnel. About 30 milliliters of pyridine are then added through the addition funnel as rapidly as possible and the resulting solution refluxed for 4 hours. At the end of this 4 hour period the solution is allowed to cool and the polymeric products contained therein precipitated by emptying the contents of the round bottom flask into a beaker containing 1,000 milliliters of methanol. The polymeric precipitate which forms is thereafter separated from the methanol by filtration. The polymeric solids which are recovered are washed several times with water and then dried at 50° C in a vacuum oven.

About 5 grams of the polymer are dissolved in 25 milliliters of hexafluoroisopropanol and the resulting solution coated on a ball grained aluminum plate. Sufficient polymer solids are deposited on the aluminum plate to form a dry film having a thickness of approximately 20 microns. Solvent residues remaining in this film are removed by placing the coated aluminum plate in a vacuum for 6 hours. The free surface of this poly(1,6-hexane diol-4,5-dinitrofluorenone-2, 7-dicarboxylate) layer is coated with a chloroform dispersion containing equal parts by weight trigonal selenium (particle size approximately 1 micron) and poly(N-vinylcarbazole). The amount of dispersion transferred to the free surface of the insulating polymer film is sufficient to form a layer having a dry film thickness of approximately 2 microns. Chloroform residues are removed from this photoconductive layer in the same manner described for removal of solvent residues from the insulating layer of electronically active materials. After fabrication of this electrophotographic imaging member, the free surface of the photoconductive layer is sensitized by charging in the dark to a negative potential of 600 volts. Following such sensitization a light and a shadow image pattern is projected onto the photoconductive layer thereby forming a latent image pattern on the surface of this layer. This latent image is developed with positively charged toner particles and the developed image thereafter transferred to a sheet of paper where it is permanently affixed by thermal fusion. The surface of the photoconductive layer is swabbed with a cotton cloth for removal of toner residues and the imaging process repeated. Image quality is acceptable.

EXAMPLE II

The procedures of Example I are repeated except for reversal of the relative arrangement of the photoconductive layer and the electronically active insulating layer relative to the aluminum substrate. Prior to the application of the photoconductive layer on the aluminum substrate, the substrate is heated in a low humidity environment for a sufficient interval to form a oxide barrier layer on the surface which is to receive the photoconductive layer. Once having formed an imaging member in the manner which is described in Example I, it is evaluated electrostatographically. Due to the reversal in the relative arrangement of the layers in the composite photoconductive insulating layer, the polarity of the sensitizing charge is positive and the toner particles used to develop the latent image formed on the surface of the insulating layer are charged negatively. The copy quality of the image prepared with this imaging member is acceptable.

EXAMPLE III

The procedures of Example I are repeated except for the preparation of the polymer of Example I from the following combinations of diols and carboxylic acid chlorides:

| Polymer | Diols | Carboxylic Acid Halides |
|---|---|---|
| 1 | ethylene glycol | 4,5-dinitrofluoroenone-2,7-dicarboxylic acid chloride |
| 2 | 1,3-propane diol | 4,5-dinitrofluoroenone-2,7-dicarboxylic acid chloride |
| 4 | 1,6-hexane diol | 9-dicyanomethylene fluorene-2,7-dicarboxylic acid chloride |
| 5 | 1,6-hexane diol | fluorenone-2,7-dicarboxylic acid chloride |
| 6 | 1,6-hexane diol | 4,5-dinitro-9-dicyanomethylene fluorenone-2,7-dicarboxylic acid chloride |
| 7 | 1,2-eicosane diol | 4,5-dinitrofluorenone-2,7-dicarboxylic acid chloride |

The photoconductive composites prepared from these polymers in the manner described in Example I are evaluated electrophotographically and copy quality is found to be acceptable.

What is claimed is:

1. An electrophotographic imaging member having a composite photoconductive insulating film wherein one layer of said film comprises a photoconductive material capable of substantial spectral response in the visible region of the electromagnetic spectrum and a second layer of electronically active insulating polymer contiguous with said photoconductive layer, said electronically active insulating polymer comprising recurring structural units of the formula:

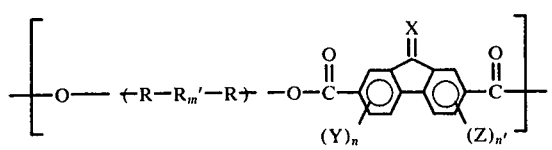

wherein
X is oxygen or dicyanomethylene;
Y and Z are independently selected from the group consisting of $NO_2$, halogen, —CN and —$CF_3$;
R is a hydrocarbylene radical having from 1 to 10 carbon atoms;
R' is oxygen or sulfur;
m is 0 or 1; and
n and n' can range from 0 to 3 said electronically active insulating polymer film being transparent, capable of facile transport of electrons which are injected into it upon photoexcitation of the contiguous photoconductive layer and incapable of substantial spectral response within the wavelength of spectral response of the photoconductive layer.

2. The imaging member of claim 1 wherein the electronically active insulating polymer is the product of the esterfication of ethylene glycol and 4,5-dinitrofluorenone-2,7-dicarboxylic acid chloride.

3. The imaging member of claim 1 wherein the electronically active insulating polymer is the product of the esterfication of 1,3-propane diol and 4,5-dinitrofluorenone-2,7-dicarboxylic acid chloride.

4. The imaging member of claim 1 wherein the electronically active insulating polymer is the product of the esterfication of 1,6-hexane diol and 4,5-dinitrofluorenone-2,6-dicarboxylic acid chloride.

5. The imaging member of claim 1 wherein the electronically active insulating polymer is the product of the esterfication of 1,6-hexane diol and 9-dicyanomethylene fluorene-2,7-dicarboxylic acid chloride.

6. The imaging member of claim 1 wherein the electronically active insulating polymer is the product of the esterfication of 1,6-hexane diol and fluorenone-2,7-dicarboxylic acid chloride.

7. The imaging member of claim 1 wherein the electronically active insulating polymer is the product of the esterfication of 1,6-hexane diol and 4,5-dinitro-9-dicyanomethylene fluorenone-2,7-dicarboxylic acid chloride.

8. The imaging member of claim 1 wherein the electronically active insulating polymer is the product of the esterfication of 1,2-eicosane diol and 4,5-dinitrofluorenone-2,7-dicarboxylic acid chloride.

9. An electrophotographic imaging member having a composite photoconductive insulating film wherein on layer of said film has a thickness in the range of from about 0.2 to about 20 microns and comprises a photoconductive material capable of substantial spectral response in the visible region of the electromagnetic spectrum and a second layer which has a thickness in the range of from about 5 to about 100 microns and comprises an electronically active insulating polymer contiguous with said photoconductive layer, the ratio of thickness of said photoconductive layer to said transport layer being in the range of from about 1:2 to about 1:200, said electronically active insulating polymer comprising recurring structural units of the formula:

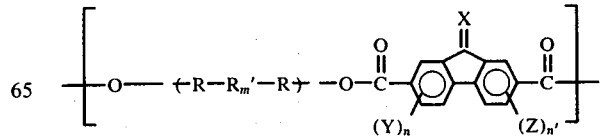

wherein
X is oxygen or dicyanomethylene;
Y and Z are independently selected from the group consisting of $NO_2$, halogen —CN and —$CF_3$;
R is a hydrocarbylene radical having from 1 to 10 carbon atoms;
R' is oxygen or sulfur;
m is 0 or 1; and
n and n'can range from 0 to 3
said electronically active insulating polymers film being transparent, capable of facile transport of electrons which are injected into it upon photoexcitation of the contiguous photoconductive layer and incapable of substantial spectral response within the wavelength of spectral response of the photoconductive layer.

10. The imaging member of claim 9 wherein the electronically active insulating polymer is the product of the esterfication of ethylene glycol and 4,5-dinitrofluorenone-2,7-dicarboxylic acid chloride.

11. The imaging member of claim 9 wherein the electronically active insulating polymer is the product of the esterfication of 1,3-propane diol and 4,5-dinitrofluorenone-2,7-dicarboxylic acid chloride.

12. The imaging member of claim 9 wherein the electronically active insulating polymer is the product of the esterfication of 1,6-hexane diol and 4,5-dinitrofluorenone-2,6-dicarboxylic acid chloride.

13. The imaging member of claim 9 wherein the electronically active insulating polymer is the product of the esterfication of 1,6-hexane diol and 9-dicyanomethylene fluorene-2,7-dicarboxylic acid chloride.

14. The imaging member of claim 9 wherein the electronically active insulating polymer is the product of the esterfication of 1,6-hexane diol and fluorenone-2,7-dicarboxylic acid chloride.

15. The imaging member of claim 9 wherein the electronically active insulating polymer is the product of the esterfication of 1,6-hexane diol and 4,5-dinitro-9-dicyanomethylene fluorenone-2,7-dicarboxylic acid chloride.

16. The imaging member of claim 9 wherein the electronically active insulating polymer is the product of the esterfication, of 1,2 eicosane-diol and 4,5-dinitrofluorenone-2,7-dicarboxylic acid chloride.

17. In an electrophotographic imaging process involving the sensitization and imagewise exposure of an electrophotographic imaging member having a composite photoconductive insulating layer comprising a layer of photoconductive material contiguous with a layer of change carrier transport material, the improvement comprising:
providing an electrophotographic imaging member having a composite photoconductive insulating film wherein one layer of said film comprises a photoconductive material capable of substantial spectral response in the visible region of the electromagnetic spectrum and a second layer of electronically active insulating polymer contiguous with said photocondutive layer,
said electronically active insulating polymer comprising recurring structural units of the formula:

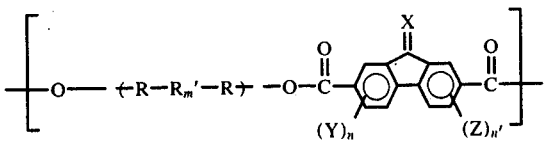

wherein
X is oxygen or dicyanomethylene;
Y and Z are independently selected from the group consisting of $NO_2$, halogen, —CN and —$CF_3$;
R is a hydrocarbylene radical having from 1 to 10 carbon atoms;
R' is oxygen or sulfur;
m is 0 to 1; and
n and n'can range from 0 to 3
said electronically active insulating polymer film being transparent, capable of facile transport of electrons which are injected into it upon photoexcitation of the contiguous photoconductive layer and incapable of substantial spectral response within the wavelength of spectral response of the photoconductive layer.

18. In an electrophotographic imaging process involving the sensitization and imagewise exposure of an electrophotographic imaging member having a composite photoconductive insulating layer comprising a layer of photoconductive material contiguous with a layer of charge carrier transport material, the improvement comprising:
providing an electrophotographic imaging member having a composite photoconductive insulating film wherein one layer of said film has a thickness in the range of from about 0.2 to about 20 microns and comprises a photoconductive material capable of substantial spectral response in the visible region of the electromagnetic spectrum and a second layer which has a thickness in the range of from about 5 to about 100 microns and comprises an electronically active insulating polymer contiguous with said photoconductive layer, the ratio of thickness of said photoconductive layer to said transport layer being in the range of from about 1:2 to about 1:200,
said electronically active insulating polymer comprising recurring structural units of the formula:

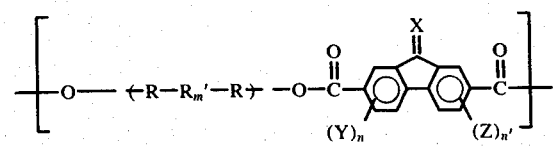

wherein
X is oxygen dicyanomethylene;
Y and Z are independently selected from the group consisting of $NO_2$, halogen —CN and —$CF_3$;
R is hydrocarbylene radical having from 1 to 10 carbon atoms;
R' is oxygen or sulfur;
m is 0 or 1; and
n and n'can range from 0 to 3
said electronically active insulating polymer film being transparent, capable of facile transport of electrons which are injected into it upon photoexcitation of the contiguous photoconductive layer and incapable of substantial spectral response within the wavelength of spectral response of the photoconductive layer.

* * * * *

UNITED STATES PATENT AND TRADEMARK OFFICE
CERTIFICATE OF CORRECTION

PATENT NO. : 4,012,251
DATED : March 15, 1977
INVENTOR(S) : Sam R. Turner

It is certified that error appears in the above-identified patent and that said Letters Patent are hereby corrected as shown below:

Column 1, line 5, beginning with the word "imaging" delete line 5 and line 6, ending with the word "Art".

Column 1, line 67, delete "being preferred", first occurrence.

Column 2, line 14, insert a parenthesis after "U.S. Pat. No. 3,848,237".

Column 2, line 37, after the word "indicates" and before the word "equivalent", delete "the" and insert --that--.

Column 3, line 1, after the word "adjacent" insert --polymer segments and on adjacent--.

Column 3, line 21, "electrophotograhic" should be --electrophotographic--.

Column 3, line 36, "phtoactivation" should be --photoactivation--.

Column 3, line 63, "photocondcutors" should be --photoconductors--.

Column 4, line 21, "photoconducitve" should be --photoconductive--.

Column 4, line 57, "conisting" should be --consisting--.

UNITED STATES PATENT AND TRADEMARK OFFICE
CERTIFICATE OF CORRECTION

PATENT NO. : 4,012,251
DATED : March 15, 1977
INVENTOR(S) : Sam R. Turner

It is certified that error appears in the above-identified patent and that said Letters Patent are hereby corrected as shown below:

Column 4, line 58, "hydrocarlyene" should be --hydrocarbylene--.

Column 8, line 46 in Claim 9, after the word "wherein" and before the word "composite", delete "on" and insert --one--.

Column 9, line 4 in Claim 9, "No$_2$" should be --NO$_2$--.

Column 9, line 10 in Claim 9, after the word "insulating" and before the word "film", delete "polymers" and insert --polymer--.

Column 9, line 56 in Claim 17, after the word "of" and before the word "carrier", delete "change" and insert --charge--.

Column 10, line 16 in Claim 17, the words "0 to 1" should be --0 or 1--.

Column 10, line 55 in Claim 18, insert the word --or-- between the words "oxygen" and "dicyanomethylene".

Signed and Sealed this

Twenty-eighth Day of June 1977

[SEAL]

Attest:

RUTH C. MASON
Attesting Officer

C. MARSHALL DANN
Commissioner of Patents and Trademarks